US010318351B2

(12) United States Patent
Auvenshine et al.

(10) Patent No.: US 10,318,351 B2
(45) Date of Patent: Jun. 11, 2019

(54) RESOURCE PROVISIONING WITH AUTOMATIC APPROVAL OR DENIAL OF A REQUEST FOR ALLOCATION OF A RESOURCE

(71) Applicant: INTERNATIONAL BUSINESS MACHINES CORPORATION, Armonk, NY (US)

(72) Inventors: John J. Auvenshine, Tucson, AZ (US); Ramani R. Routray, San Jose, CA (US); Stanley C. Wood, Round Rock, TX (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 20 days.

(21) Appl. No.: 15/498,891

(22) Filed: Apr. 27, 2017

(65) Prior Publication Data

US 2018/0314555 A1 Nov. 1, 2018

(51) Int. Cl.
*G06F 9/46* (2006.01)
*G06F 9/50* (2006.01)

(52) U.S. Cl.
CPC .................. *G06F 9/5005* (2013.01)

(58) Field of Classification Search
CPC ................ G06F 9/50; G06F 17/30082; G06F 2209/504; G06F 9/5027
See application file for complete search history.

(56) References Cited

U.S. PATENT DOCUMENTS

| 8,046,763 | B1 | 10/2011 | Czajkowski et al. |
| 9,240,025 | B1* | 1/2016 | Ward, Jr. .................. G06F 9/50 |
| 2006/0250968 | A1* | 11/2006 | Hudis ................. H04L 43/0817 370/241 |
| 2011/0093596 | A1* | 4/2011 | Zimmet ................ G06F 9/5061 709/226 |
| 2011/0145392 | A1 | 6/2011 | Dawson et al. |

(Continued)

FOREIGN PATENT DOCUMENTS

| JP | 2001207206 | 7/2001 |
| WO | 2014147438 | 9/2014 |

OTHER PUBLICATIONS

Specification "Resource Provisioning With Automatic Approval or Denial of a Request for Allocation of a Resource" and Drawings in U.S. Appl. No. 16/399,225, filed Apr. 30, 2019, 31 pages.

(Continued)

*Primary Examiner* — Dong U Kim
(74) *Attorney, Agent, or Firm* — Jay Wahlquist; Andrew D. Wright; Roberts Mlotkowski Safran Cole & Calderon, P.C.

(57) ABSTRACT

Systems and methods for resource provisioning are disclosed. A method includes: generating, by a computer device, a resource provisioning policy for a resource; receiving, by the computer device, a request for an allocation of the resource from an account; applying, by the computer device, the resource provisioning policy to the request based on receiving the request; automatically approving or denying, by the computer device, the request based on the applying the resource provisioning policy to the request; updating, by the computer device, the resource provisioning policy for the account based on the automatic approving or denying the request.

20 Claims, 3 Drawing Sheets

(56) References Cited

U.S. PATENT DOCUMENTS

| | | | |
|---|---|---|---|
| 2012/0084443 A1* | 4/2012 | Theimer | G06F 9/45533 709/226 |
| 2013/0125199 A1* | 5/2013 | Novak | G06Q 10/04 726/1 |
| 2013/0275590 A1* | 10/2013 | Wong | H04L 63/10 709/225 |
| 2014/0195683 A1 | 7/2014 | Ammerman, III et al. | |
| 2015/0188840 A1* | 7/2015 | Xiao | G06F 9/50 709/226 |
| 2015/0355932 A1 | 12/2015 | Hiebert et al. | |
| 2016/0026501 A1 | 1/2016 | Polkovnikov et al. | |
| 2016/0043970 A1* | 2/2016 | Jacob | H04L 47/828 709/226 |
| 2016/0179576 A1* | 6/2016 | Zhou | G06F 9/50 707/694 |
| 2017/0006032 A1* | 1/2017 | Simpson | H04W 4/21 |
| 2018/0152478 A1* | 5/2018 | Zhou | H04L 63/10 |

OTHER PUBLICATIONS

List of IBM Patents or Patent Applications Treated as Related, Apr. 30, 2019, 1 page.

* cited by examiner

RESOURCE PROVISIONING WITH AUTOMATIC APPROVAL OR DENIAL OF A REQUEST FOR ALLOCATION OF A RESOURCE

BACKGROUND

The present invention relates generally to resource provisioning and, more particularly, to a system and method for provisioning resources of an enterprise data center.

Resource provisioning in an enterprise data center is a complex process involving change management, multiple levels of authorizations for the resource provisioning, and standardization of information across multiple management towers within the enterprise data center. Conventionally performed by individuals, implementation of the resource provisioning involves multiple approval and execution steps, which may be inefficient and time consuming.

SUMMARY

In an aspect of the invention, a computer implemented method includes: generating, by a computer device, a resource provisioning policy for a resource; receiving, by the computer device, a request for an allocation of the resource from an account; applying, by the computer device, the resource provisioning policy to the request based on receiving the request; automatically approving or denying, by the computer device, the request based on the applying the resource provisioning policy to the request; updating, by the computer device, the resource provisioning policy for the account based on the automatic approving or denying the request.

In another aspect of the invention, a computer program product comprises a computer readable storage medium having program instructions embodied therewith. The program instructions are executable by a computer device to cause the computer device to: generate a maximum size, a maximum allocation percentage, and a maximum utilization percentage of a resource provisioning policy for a resource; receive a request for an allocation of the resource from an account; apply the resource provisioning policy on the request based on receiving the request; automatically approving or denying the request based on the request having values that differ from the maximum size, the maximum allocation percentage, and the maximum utilization percentage of the resource provisioning policy; forwarding the request to a custodian based on automatically denying the request; and update the resource provisioning policy for the account based on the automatic approving or denying the request.

In another aspect of the invention, there is a system that includes: a CPU, a computer readable memory and a computer readable storage medium associated with a computing device; program instructions to generate a resource provisioning policy for a resource based on analyzing historical request data on a database; program instructions to receive a request for an allocation of the resource from an account; program instructions to apply the resource provisioning policy on the request based on receiving the request; program instructions to one of: automatically approve the request based on the request having values less than a maximum size, a maximum allocation percentage, and a maximum utilization percentage of the resource provisioning policy, and automatically deny the request based on the request having values greater than the maximum size, the maximum allocation percentage, and the maximum utilization percentage of the resource provisioning policy; program instructions to forward the request to a custodian in response to the automatic denial of the request; and program instructions to update the resource provisioning policy for the account based on the automatic approval or denial of the request. The program instructions are stored on the computer readable storage medium for execution by the CPU via the computer readable memory.

BRIEF DESCRIPTION OF THE DRAWINGS

The present invention is described in the detailed description which follows, in reference to the noted plurality of drawings by way of non-limiting examples of exemplary embodiments of the present invention.

DETAILED DESCRIPTION

Figure 1:
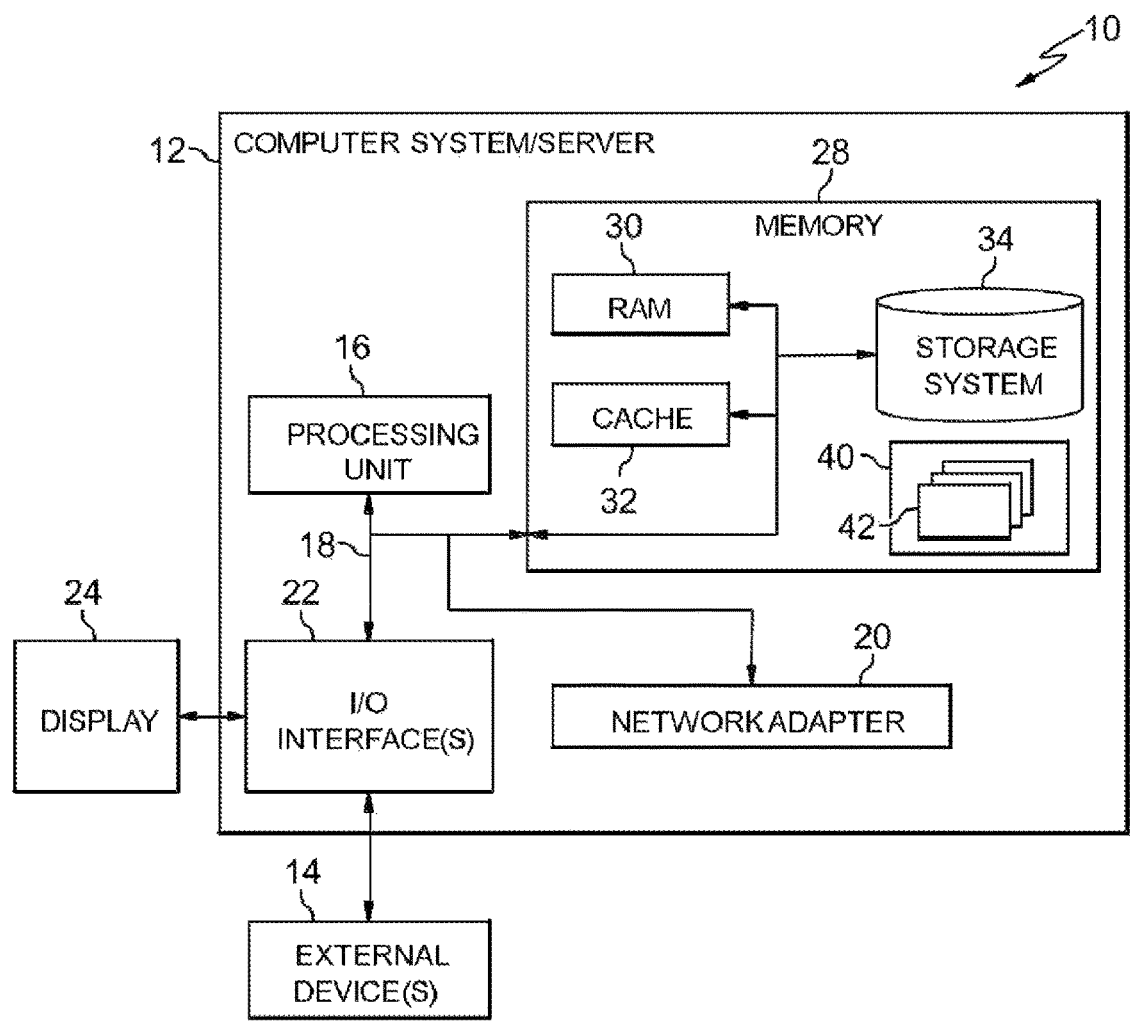
FIG. 1 depicts a computing infrastructure according to an embodiment of the present invention.

The present invention relates generally to resource provisioning and, more particularly, to a system and method for provisioning resources of an enterprise data center. In aspects, a computer device initially generates a resource provisioning policy for allocating a resource and receives a request for an allocation of the resource from different accounts. For example, the resource may be storage space on a database and the request for the allocation of the resource may be a request for a certain amount of the storage space. In another example, the resource may be text analysis software and the request for the allocation of the resource may be an execution of the text analysis software on an email application. In aspects, after receiving the request for the allocation of the resource, the computer device applies the resource provisioning policy on the request and updates the resource provisioning policy. By updating the resource provisioning policy, the computer device may improve the accuracy of the resource provisioning policy.

Conventionally, custodians are tasked with authorizing resource allocation of the resource. The resource at the service layer may be published for consumers or accounts with specific visibility which is taken into consideration by the custodians. The process for the custodians to review the request for the allocation of the resource involves multiple approval and execution steps using existing primitives and tools. For example, the custodian receives a request from an account for the allocation of the resource and the custodians process the request and determines a grant of the request for allocation of the resource to the account. While this may ensure quality resource allocation, the mechanism of approval by the custodian becomes time-consuming and inefficient for requests from multiple accounts and as the complexity of the requests increases.

Aspects of the present invention provide a system that mines historical requests and approval patterns for individual accounts and recommends a resource provisioning policy that enables self-service/auto-approval of new requests versus approval by a custodian. Aspects of the present invention also provide a what-if analysis layer that evaluates the risk versus gain for the policy. The what-if environment for the policy achieves agility and operational efficiency for the system.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Referring now to FIG. 1, a schematic of an example of a computing infrastructure is shown. Computing infrastructure 10 is only one example of a suitable computing infrastructure and is not intended to suggest any limitation as to the scope of use or functionality of embodiments of the invention described herein. Regardless, computing infrastructure 10 is capable of being implemented and/or performing any of the functionality set forth hereinabove.

In computing infrastructure 10 there is a computer system (or server) 12, which is operational with numerous other general purpose or special purpose computing system environments or configurations. Examples of well-known computing systems, environments, and/or configurations that may be suitable for use with computer system 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system 12 may be described in the general context of computer system executable instructions, such as program modules, being executed by a computer system. Generally, program modules may include routines, programs, objects, components, logic, data structures, and so on that perform particular tasks or implement particular abstract data types. Computer system 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system 12 in computing infrastructure 10 is shown in the form of a general-purpose computing device. The components of computer system 12 may include, but are not limited to, one or more processors or processing units (e.g., CPU) 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system 12 typically includes a variety of computer system readable media. Such media may be any available media that is accessible by computer system 12, and it includes both volatile and non-volatile media, removable and non-removable media.

System memory 28 can include computer system readable media in the form of volatile memory, such as random access memory (RAM) 30 and/or cache memory 32. Computer system 12 may further include other removable/non-removable, volatile/non-volatile computer system storage media. By way of example only, storage system 34 can be provided for reading from and writing to a nonremovable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system 12 may also communicate with one or more external devices 14 such as a keyboard, a pointing device, a display 24, etc.; one or more devices that enable a user to interact with computer system 12; and/or any devices (e.g., network card, modem, etc.) that enable computer system 12 to communicate with one or more other computing devices. Such communication can occur via Input/Output (I/O) interfaces 22. Still yet, computer system 12 can communicate with one or more networks such as a local area network (LAN), a general wide area network (WAN), and/or a public network (e.g., the Internet) via network adapter 20. As depicted, network adapter 20 communicates with the other components of computer system 12 via bus 18. It should be understood that although not shown, other hardware and/or software components could be used in conjunction with computer system 12. Examples, include, but are not limited to: microcode, device drivers, redundant processing units, external disk drive arrays, RAID systems, tape drives, and data archival storage systems, etc.

Figure 2:
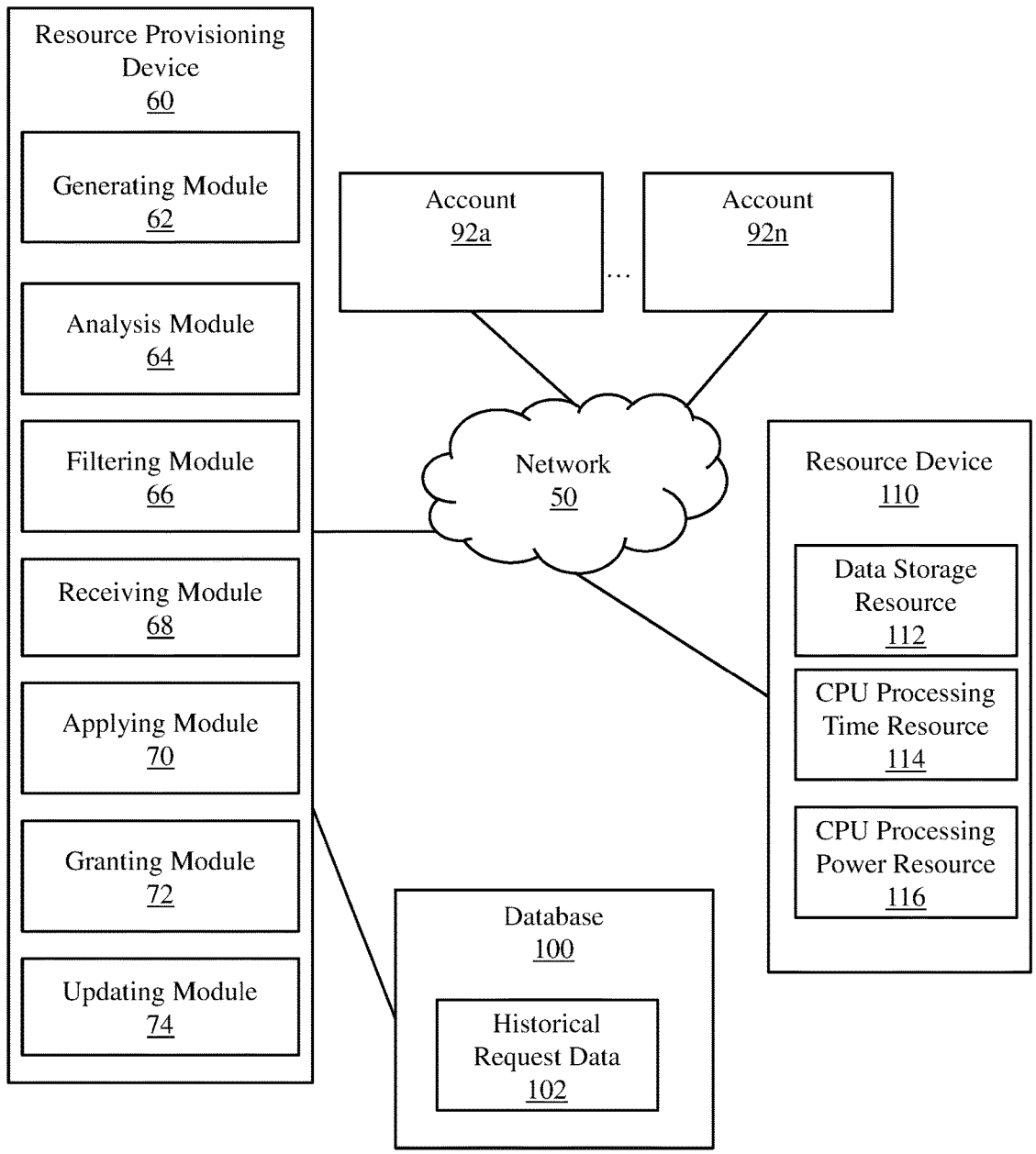
FIG. 2 shows an exemplary environment in accordance with aspects of the invention.

FIG. 2 shows an exemplary environment in accordance with aspects of the invention. Provisioning resources is a complex process involving granting a request for an allocation of a resource through change management, multiple levels of approval, and standardization across multiple management towers in the enterprise data center. For example, an application administrator requesting storage for log space of a highly transactional storage is different than the application administrator requesting storage for a backup of a database. Some of the attributes of resource provisioning that are translated from the application side requirements (e.g., number of transactions per second for the database) to the infrastructure side requirements (e.g., storage RAID, storage tier, storage replication for availability) include performance, availability, and resilience.

In aspects, historical lists of requests for allocation of a resource may be retrieved from change management, ticket management and service management systems. These historical lists have enough data points to describe the requester, request start time, request completion time, request approval chain, and status of the end result. Using these data points as a feature set, aspects of the present invention develop a resource provisioning policy with a classification system.

By way of example, in machine learning and statistics, classification involves the problem of identifying which of a set of categories a new observation belongs and identifying a training policy for category membership of the observations. For example, identifying the set of requests that were successful (which constitutes the bulk/majority of the requests), identifying the set of requests within a specific range with a very minimal approval period, and identifying the set of requests with a significantly low number of rejections may be difficult for a large data set. By introducing feature engineering on the data set of requests, aspects of the present invention develop the resource provisioning policy with a classification system rule and develop a confidence level for the resource provisioning policy. This classification system rule may be validated from the custodians of environment and can be iteratively run to adjust a threshold for the resource provisioning policy based on accuracy of the classification system rule.

In provisioning resources for the request and orchestrating the policy, the self-service/auto-approval of the request may involve a tension between the operational efficiency of the system versus utilization of the resources. For example, the custodian may desire processing as many requests as possible versus maintaining control over the request which utilizes scarce resources. The decision at which level to permit automatic allocation of the resources versus being denied or requiring extra approval is not straight forward and may often be made with minimal information. To alleviate these issues, aspects of the present invention provide a system for determining policies for automatic allocation of resources and provide dynamic tracking to account for changing capacity and utilization factors of the enterprise data center.

Aspects of the present invention involve mining a historical database and suggesting policies to a storage administrator, automatically setting the policies, and adjusting the policies based on changes in the available capacity of the enterprise data center infrastructure. In aspects, the system provides an automated resource allocation system that selects requests of resource allocation from the historical database with parameters which have a pre-selected confidence of approval or denial. In aspects, the system uses the policies to automatically approve or deny a new request having new parameters for the policy. In aspects, the system stores the new parameters of the policy to improve the automatic approval or denial of future requests.

Referring to FIG. 2, the exemplary environment includes a resource provisioning device 60 which may comprise a computer system 12 of FIG. 1, and may be connected to a network 50 (e.g., via the network adapter 20 of FIG. 1). The network 50 may be any suitable communication network or combination of networks, such as a local area network (LAN), a general wide area network (WAN), a public network (e.g., the Internet), a 3G network, a Long-Term Evolution (LTE) network, and/or a 5G network.

Still referring to FIG. 2, the resource provisioning device 60 may be configured for wireless communication (e.g., 3G, LTE) with one or more of the accounts 92a-n over the network 50. In aspects, the accounts 92a-n may be remote computer devices that perform network communication with the resource provisioning device 60. In aspects, the accounts 92a-n are represented as account 92a to account 92n, where n may be any appropriate number of separate accounts that perform wireless communication with the resource provisioning device 60. For example, account 92a to account 92n may be individual users or logins of a local server system or a remote server system which communicates with the resource provisioning device 60 over the network 50. In another example, account 92a to account 92n may be autonomous processes operating on the local server system or the remote server system which communicates with the resource provisioning device 60.

Still referring to FIG. 2, the resource provisioning device 60 may comprise a plurality of modules configured to perform one or more functions described herein. In aspects, the resource provisioning device 60 may include additional or fewer modules than those shown in FIG. 2. In aspects, separate components may be integrated into a single computing component or module. Additionally, or alternatively, a single module may be implemented as multiple computing components or modules.

In aspects, the resource provisioning device 60 includes a generating module 62, an analysis module 64, a filtering module 66, a receiving module 68, an applying module 70, a granting module 72, and an updating module 74, which may each comprise one or more program modules (e.g., program module 42 of FIG. 1) executed by the resource provisioning device 60. In aspects, the generating module 62 is configured to generate a resource provisioning policy for a resource. In aspects, the resource may be located at a resource device 100 and may include, but is not limited to, a data storage resource 112 (e.g., utilization of storage space), a CPU processing time resource 114 (e.g., utilization of CPU processing time), and a CPU processing power resource 116 (e.g., utilization of CPU processing power which may be the number of CPUs, CPU cores, and the clock speed setting of the CPUs or CPU cores). In aspects, the resource device 100 may be a database or other computer device that accesses and controls the resource. In aspects, the analysis module 64 and the filtering module 66 are configured to analyze and filter the historical request data 102 from a database 100 to generate the resource provisioning policy.

In aspects, the receiving module 68 is configured to receive requests for an allocation of the resource from accounts 92a-n. In aspects, the applying module 70 is configured to apply the resource provisioning policy to the received request based on receiving the request from the accounts 92a-n. In aspects, the granting module 72 is configured to approve or deny the received request from the accounts 92a-n based on applying the resource provisioning policy to the received request and store the approval or denial of the received request in a memory (e.g., memory 28 of FIG. 1) based on approving or denying the received request. In aspects, the granting module 72 is configured to forward the received request to a custodian for the approval or denial of the received request and record the decision by the custodian in the memory. In aspects, the updating module 74 is configured to update the resource provisioning policy based on applying the resource provisioning policy to the received request. In aspects, the updating module 74 is configured to update the resource provisioning policy for the accounts 92a-n based on the custodian approving or denying the received request.

Figure 3:
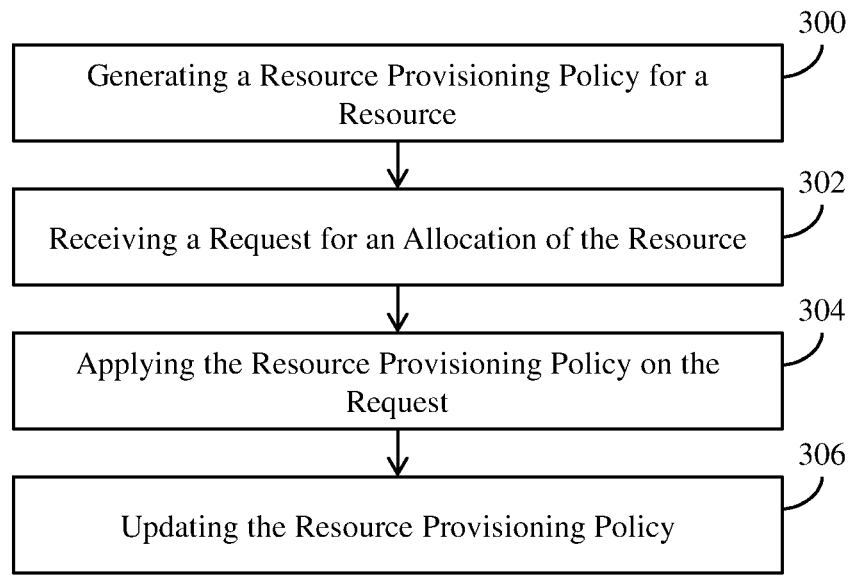
FIG. 3 illustrates a flowchart of steps of a method in accordance with aspects of the invention.

FIG. 3 shows a flowchart of steps of a method in accordance with aspects of the invention. The steps of the method may be performed in the system of FIG. 2 and are described with reference to the elements and functions described in FIG. 2.

At step 300, the resource provisioning device 60 generates a resource provisioning policy for a resource (e.g., the data storage resource 112, the CPU processing time resource 114, and the CPU processing power resource 116). In aspects, the generating module 62 generates the resource provisioning policy for the resource based on an analysis of the historical request data 102 (e.g., requests for resource allocation from the accounts 92a-n) on the database 100 by an analysis module 64. The historical request data 102 may be plotted on a chart illustrating a clustering of the request data over a period of time. The analysis of the historical request data 102 may be based on determining a time period for review (e.g., one year) of the historical request data 102 and determining approval conditions (e.g., 90% approval rate) of the historical request data 102.

In aspects, the analysis of the historical request data 102 includes: analyzing historical request data 102 on the database 100 according to size, allocation percentage, and utilization percentage. The size may include a file size of the historical request data in the database 100 (e.g., the file size in bytes). The allocation percentage may include a percentage of requests from an account where most of the requests for that account were approved (e.g., 90% of requests from account 92a were approved). The utilization percentage may include a percentage of a particular type of request from the account that were approved (e.g., 90% of emergency requests from account 90a were approved).

In aspects, based on the analysis of the historical request data 102, the generating module 62 generates the resource provisioning policy according to a MAX(SIZE), a MAX(ALLOCATION), and a MAX(USED) of the historical request data 102. In aspects, the MAX(SIZE) is a maximum size of the requests in the historical request data 102 that were approved or denied over a period of time, the MAX(ALLOCATION) is a maximum allocation percentage for a storage pool of a storage tier before all requests to that pool are denied for an account, and the MAX(USED) is a maximum utilization percentage of the storage pool of the storage tier before all the requests to that pool are denied for the account. For example, the MAX(ALLOCATION) of the storage pool of the storage tier may be maximum allocation percentage (e.g., 100% for thick provisioning of the storage pool, or 120% for thin provisioning of the storage pool) before all requests to that pool are denied for the account. For example, the MAX(USED) of the storage pool of the storage tier may be maximum use percentage (e.g., 85% for thin provisioning of the storage pool) before all requests to that pool are denied for the account.

In the alternative, a user may define the resource provisioning policy according to default parameters. For example, the resource provisioning policy for the historical request data 102 of account 92a may be based on a one year time period where 90% of requests for less than 200 GB were approved so that the resource provisioning policy includes a parameter to approve all requests for less than 200 GB. The resource provisioning policy may include a parameter where the remaining 10% is forwarded to a custodian for approval.

In aspects, the MAX(SIZE), the MAX(ALLOCATION), and the MAX(USED) of the historical request data 102 may be divided according to a sub-item (e.g., per device, per time, per pool, per tier, per project, per urgency flag) of the historical request data 102. The MAX(SIZE), the MAX(ALLOCATION), and the MAX(USED) for the resource provisioning policy for any sub-item is the smaller of either the MAX(SIZE) for the historical request data or the MAX(SIZE) for that sub-item.

In aspects, the analysis module 64 analyzes the historical request data 102 of the database 100 on approved requests and denied requests. In aspects, execution of the analysis on the approved requests and the denied requests is used in generating the MAX(SIZE), MAX(ALLOCATION), and MAX(USED) for the resource provisioning policy. For example, based on analyzing the approved requests, the resource provisioning policy classifies size of requests that were successful, identifies a bulk of the requests that require minimal approval time, and identifies requests that have a low rejection rate. In another example, based on analyzing the denied requests, the resource provisioning policy classifies size of requests that were unsuccessful, identifies a bulk of the requests that require significant approval time, and identifies requests that have a high rejection rate.

In aspects, prior to executing the analysis of the denied requests, a filtering module 66 uses text analysis or other reason codes to eliminate certain types of the denied requests which may not be related to generating the resource provisioning policy. For example, the types of the denied requests not related to generating the resource provisioning policy may include: requests denied to technical design defects, requests denied due to project cancellation, and requests denied for policies around the time the policies are altered.

In aspects, the filtering module 66 uses text analysis or other user defined reasoning to include certain types of the denied requests which may be related to generating the resource provisioning policy. For example, the types of the denied requests related to generating the resource provisioning policy may include: requests that were reassigned to a different storage tier and then approved and requests that were downsized and then approved.

In aspects, a request that was reassigned to a different storage tier or downsized and then approved may be classified as multiple requests. For example, if the original request to a storage tier is denied and reassigned to a different storage tier and approved by the different storage tier, the reassigned request may be treated as an approved request for the generation of the resource provisioning policy. In another example, if the original request was denied and downsized by the storage tier and then approved by the storage tier, the downsized request may be treated as an approved request for the generation of the resource provisioning policy.

In aspects, execution of the analysis of the approved requests and the denied requests determines the confidence interval for the resource provisioning policy. The confidence level is user defined and may be adjusted according to the analysis of the approved requests and the denied requests. In aspects, the confidence level may be determined according to the sub-item (e.g., per device, per time, per pool, per tier, per project, per urgency flag) of the historical request data 102.

For example, if 900 requests out of 1000 requests for 200 GB were approved and 100 requests out the 1000 requests for 200 GB were denied, then the confidence interval for a request of less than 200 GB being approved would be high. By way of example, the resource provisioning policy generated by the generating module 62 would include a policy parameter of including requests for less than 200 GB. In aspects, the policy parameters included in the resource provisioning policy may include the confidence interval for each sub-item MAX(SIZE), MAX(ALLOCATION), and MAX(USED) for the resource provisioning policy.

In aspects, based on executing of the analysis of approved requests and denied requests, the generating module 62, reconciles MAX(SIZE), MAX(ALLOCATION), and MAX(USED) of approved requests with the MAX(SIZE), MAX(ALLOCATION), and MAX(USED) of denied requests to generate the resource provisioning policy. For example, the resource provisioning policy generated may be the smaller of the MAX(SIZE), MAX(ALLOCATION), and MAX(USED) calculated for approved requests versus the MAX(SIZE), MAX(ALLOCATION), and MAX(USED) generated for denied requests.

At step 302, based on generating the resource provisioning policy for the resource at step 300, the resource provisioning device 60 receives a request for an allocation of the resource. In aspects, based on generating the resource provisioning policy at step 300, the receiving module 68 receives a request for allocation of the resource from one of the accounts 92a-n. For example, the receiving module 68 may receive a request for using 200 GB of storage at an enterprise data center from an account 92a.

At step 304, based on receiving the request for allocation of the resource at step 302, the applying module 70 in the resource provisioning device 60 applies the resource provisioning policy from step 300 to the request. For example, based on receiving the request for using 200 GB of storage, the applying module 70 applies the MAX(SIZE) of 200 GB calculated for resource provisioning policy to the request for using 200 GB of storage.

In aspects, if the size of the request for allocation, the allocation percentage, and the utilization percentage does not exceed the MAX(SIZE), the MAX(ALLOCATION), and the MAX(USED) of the resource provisioning policy, then the granting module 72 automatically approves the request for allocation of the resource without custodian intervention. In aspects, the granting module 72 automatically approves all requests where the request is not greater than the MAX(SIZE), the MAX(ALLOCATION), and the MAX(USED) of the resource provisioning policy. For example, based on applying the MAX(SIZE) of 200 GB to the request for using 200 GB of storage from account 90a, the granting module 72 automatically approves all requests for using 200 GB of storage.

In aspects, if the size of the request for allocation, the allocation percentage to account 90a at the time of the request, and utilization percentage of the account 90a at the time of the request does exceed the MAX(SIZE), the MAX (ALLOCATION), and the MAX(USED) of the resource provisioning policy, the granting module 72 automatically denies the request for allocation of the resource and forwards the denial of the request to a custodian (e.g., a human administrator) for later approval or further denial. In aspects, the granting module 72 automatically denies all requests where the request is greater than the MAX(SIZE), the MAX(ALLOCATION), and the MAX(USED) of the resource provisioning policy In aspects, the denial of the request for the allocation may be based on any one of the MAX(SIZE), the MAX(ALLOCATION), and the MAX (USED) or on a combination of the MAX(SIZE), the MAX (ALLOCATION), and the MAX(USED).

For example, based on receiving the request for using 300 GB of storage from 90n, the granting module 72 denies all requests for using 300 GB of storage if the MAX(SIZE) calculated for resource provisioning policy is 200 GB. In another example, the granting module 72 denies all requests where 90% of all requests of 200 GB from account 92a were denied if the MAX(SIZE) is 200 GB, denies all of the requests from the account 92a received at a storage pool where the MAX(ALLOCATION) for the storage pool receiving the requests from the account 92a is 100% (e.g., thick provisioning), and denies all requests from the account 92a received at a storage pool where the MAX(ALLOCATION) for the storage pool receiving the requests from the account 92a is over 120% (e.g., thin provisioning) and the MAX(ALLOCATION) for the storage pool receiving the requests from the account 92a is 85%. The granting module 72 forwards the denial of the request for the allocation to the custodian for later approval or further denial.

In aspects, the approval of the request for allocation of the resource, the denial of the request for the allocation, and the forwarding of the request for the allocation may be stored on the memory 28 of the resource provisioning device 60. In aspects, the storage of the approval, the denial, and the forwarding may be stored individually for accounts 92a-n. For example, the approval of the request for 200 GB of storage for account 90a is stored on the memory 28 and the denial and the forwarding of the request for 300 GB of storage for 92n is stored in the memory 28.

At step 306, based on applying the resource provisioning policy on the request for the allocation of the resource at step 304, the resource provisioning device 60 updates the resource provisioning policy. In aspects, based on applying the resource provisioning policy on the request for the allocation of the resource at step 304, the updating module 74 updates the resource provisioning policy for the accounts 90a-n. In aspects, the updating module 74 may iteratively update the resource provisioning policy based on user defined settings (e.g., update the resource provisioning policy every six months, update the resource provisioning policy after 100 requests, or update the resource provisioning policy during inactive periods). In aspects, the updating module 74 updates the resource provisioning policy based on the custodian approving or denying the received request. In aspects, the updating of the resource provisioning policy improves the accuracy of the resource provisioning policy for further use and may be similar to the generating of the resource provisioning policy by the generating module 62.

For example, based on receiving 100 requests for the allocation of storage from the account 90a, the updating module 74 updates the resource provisioning policy for the account 90a based on an analysis of the requests. By way of example, if the MAX(SIZE) for the resource provisioning policy is set to less than 200 GB and 90% of requests of 300 GB forwarded to the custodian are approved, the updating module 74 updates the MAX(SIZE) for the resource provisioning policy to 300 GB. In aspects, the approval or denial of the request of resource allocation of greater than 200 GB is stored in the system and the resource provisioning policy stored in the system is updated to include approval of requests for greater than 300 GB.

In embodiments, a service provider could offer to perform the processes described herein. In this case, the service provider can create, maintain, deploy, support, etc., the computer infrastructure that performs the process steps of the invention for one or more customers. These customers may be, for example, any business that requires device access.

In still another embodiment, the invention provides a computer-implemented method. In this case, a computer infrastructure, such as computer system 12 (FIG. 1), can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computer system 12 (as shown in FIG. 1), from a computer-readable medium; (2) adding one or more computing devices to the computer infrastructure; and (3) incorporating and/or modifying one or more existing systems of the computer infrastructure to enable the computer infrastructure to perform the processes of the invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, comprising:
generating, by a computer device, a resource provisioning policy for a resource;
receiving, by the computer device, a request for an allocation of the resource from an account;
applying, by the computer device, the resource provisioning policy to the request based on receiving the request;
automatically approving or denying, by the computer device, the request based on the applying the resource provisioning policy to the request;
updating, by the computer device, the resource provisioning policy for the account based on the automatic approving or denying the request,
wherein the resource is a database in a remote resource device and the request is for allocating an amount of storage space in the database, and
wherein the generating comprises analyzing approved requests for the allocation of the resource and denied requests for the allocation of the resource contained in a historical request database,
further comprising filtering the denied requests stored in the historical request database, prior to executing the analyzing on the denied requests, to determine whether the denied request is related to the generation of the resource provisioning policy to eliminate from analysis requests which were denied for reasons not related to the generating of the resource provisioning policy.

2. The method of claim 1, wherein the analyzing is based on determining a time period for review of the historical request data and approval conditions of the historical request data.

3. The method of claim 1, wherein the analyzing comprises: analyzing the historical request data based on one of: a maximum size, a maximum allocation percentage, and a maximum utilization percentage.

4. The method of claim 3, wherein the maximum size comprises a file size of the historical request data.

5. The method of claim 3, wherein the maximum allocation percentage comprises an allocation percentage before all requests are denied for the account.

6. The method of claim 3, wherein the maximum utilization percentage comprises a utilization percentage before all the requests are denied for the account.

7. The method of claim 1, further comprising determining a confidence interval for the resource provisioning policy based on the executing the analyzing on the approved requests and the denied requests.

8. The method of claim 1, wherein the automatically approving the request comprises automatically approving the request based on the request having values less than the maximum size, the maximum allocation percentage, and the maximum utilization percentage of the resource provisioning policy, and
wherein the automatically denying the request comprises automatically denying the request based on the request having values greater than one of the maximum size, the maximum allocation percentage, and the maximum utilization percentage of the resource provisioning policy.

9. The method of claim 1, wherein the filtering of the denied request is based on text analysis.

10. The method of claim 1, wherein the filtering eliminates from analysis requests that were denied due to technical design defects.

11. The method of claim 1, wherein the filtering eliminates from analysis requests that were denied due to project cancellation.

12. The method of claim 1, wherein the filtering passes for analysis denied requests which are subsequently approved after being reassigned to a different storage tier of the database in the remote resource device.

13. A computer program product comprising a computer readable storage medium having program instructions embodied therewith, the program instructions executable by a computer device to cause the computer device to:
generate a maximum size, a maximum allocation percentage, and a maximum utilization percentage of a resource provisioning policy for a resource;
receive a request for an allocation of the resource from an account;
apply the resource provisioning policy on the request based on receiving the request;
automatically approving or denying the request based on the request having values that differ from the maximum size, the maximum allocation percentage, and the maximum utilization percentage of the resource provisioning policy;
forwarding the request to a custodian based on automatically denying the request; and
update the resource provisioning policy for the account based on the automatic approving or denying the request,
wherein the resource is text analysis software stored in a remote resource device, and the request is for execution of the text analysis software in an application stored in the computer device,
wherein the generating comprises analyzing approved requests for the allocation of the resource and denied requests for the allocation of the resource contained in a historical request database, and
wherein the program instructions are further executable by the computer device to cause the computer device to filter the denied requests stored on the historical request database, prior to executing the analyzing on the denied requests, to determine whether the denied request is related to the generation of the resource provisioning policy to eliminate from analysis requests which were denied for reasons not related to the generating of the resource provisioning policy.

14. The computer program product of claim 13, wherein the generating further comprises analyzing historical request data stored in the historical request database based on default parameters.

15. The computer program product of claim 14, wherein the analyzing comprises: analyzing the historical request data based on the maximum size, the maximum allocation percentage, and the maximum utilization percentage.

16. The computer program product of claim 14, further comprising dividing at least one selected from the group consisting of: the maximum size, the maximum allocation percentage, and the maximum utilization percentage of the resource provisioning policy based on at the least one selected from a group consisting of: per device, per time, per pool, per tier, and per project of the historical request data.

17. The computer program product of claim 13, wherein the updating further comprises updating the resource provisioning policy for the account based on a custodian approving or denying the request.

18. A system comprising:
a CPU, a computer readable memory and a computer readable storage medium associated with a computing device;
program instructions to generate a resource provisioning policy for a resource based on analyzing historical request data on a database;
program instructions to receive a request for an allocation of the resource from an account;
program instructions to apply the resource provisioning policy on the request based on receiving the request;
program instructions to one of: automatically approve the request based on the request having values less than a maximum size, a maximum allocation percentage, and a maximum utilization percentage of the resource provisioning policy, and automatically deny the request based on the request having values greater than the maximum size, the maximum allocation percentage, and the maximum utilization percentage of the resource provisioning policy;
program instructions to forward the request to a custodian in response to the automatic denial of the request; and
program instructions to update the resource provisioning policy for the account based on the automatic approval or denial of the request,
wherein the resource is a database in a remote resource device and the request is for allocating an amount of storage space in the database, and
wherein the generating comprises analyzing approved requests for the allocation of the resource and denied requests for the allocation of the resource contained in a historical request database,
further comprising program instructions to filter the denied requests stored in the historical request database, prior to executing the analyzing on the denied requests, to determine whether the denied request is related to the generation of the resource provisioning policy to eliminate from analysis requests which were denied for reasons not related to the generating of the resource provisioning policy, and
wherein the program instructions are stored on the computer readable storage medium for execution by the CPU via the computer readable memory.

19. The system of claim 18, wherein the generating further comprises determining a time period for review of historical request data stored in the historical request data and approval conditions of the historical request data.

20. The system of claim 18, further comprising dividing at least one selected from the group consisting of: the maximum size, the maximum allocation percentage, and the maximum utilization percentage of the resource provisioning policy based on at the least one selected from a group consisting of: per device, per time, per pool, per tier, and per project of the historical request data.

* * * * *